March 26, 1940.        C. M. TAYLOR         2,195,137
                        WRITING GUIDE
                    Filed Dec. 30, 1938         2 Sheets-Sheet 1
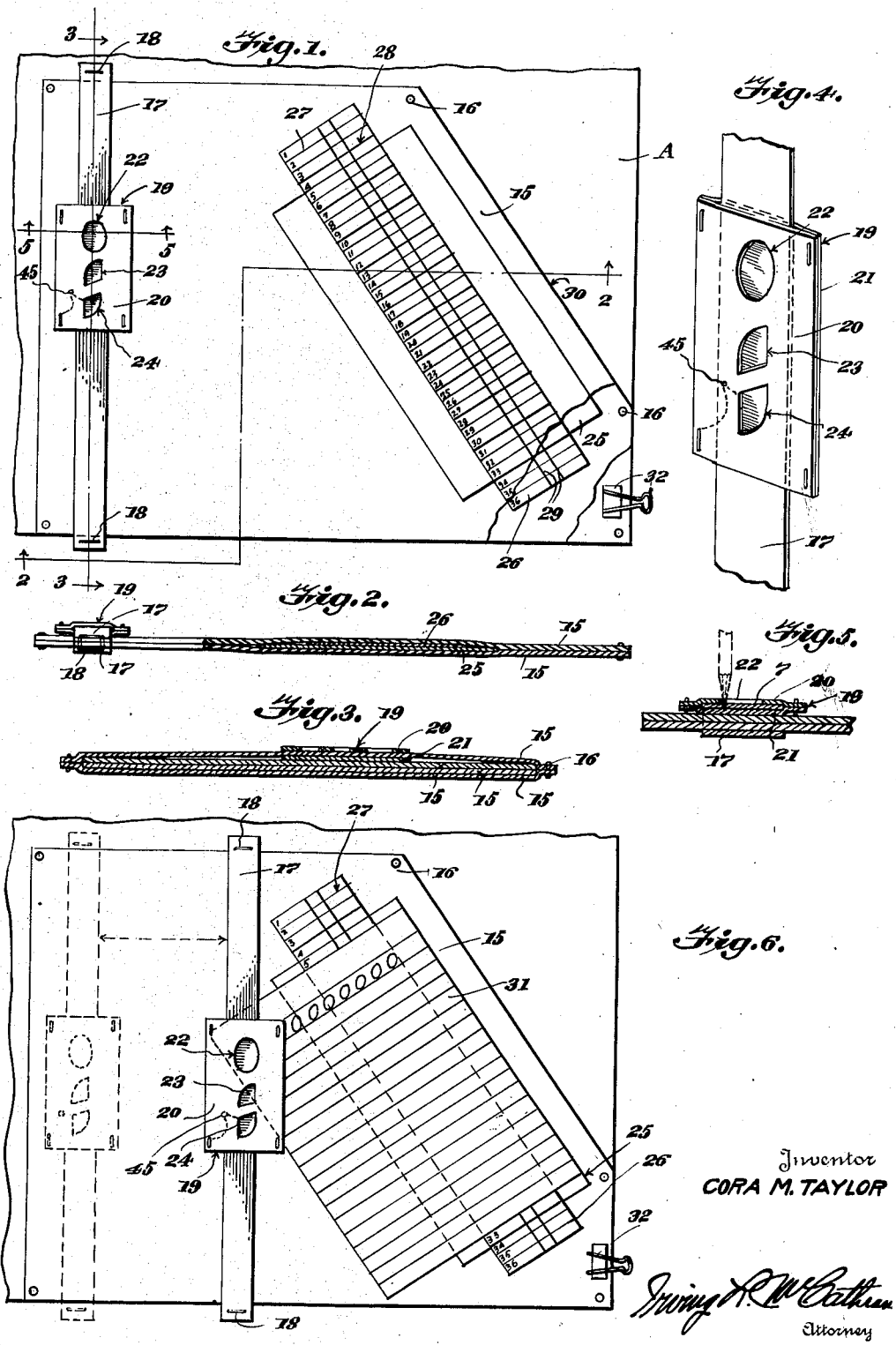
Inventor
CORA M. TAYLOR March 26, 1940.  C. M. TAYLOR  2,195,137
WRITING GUIDE
Filed Dec. 30, 1938  2 Sheets-Sheet 2
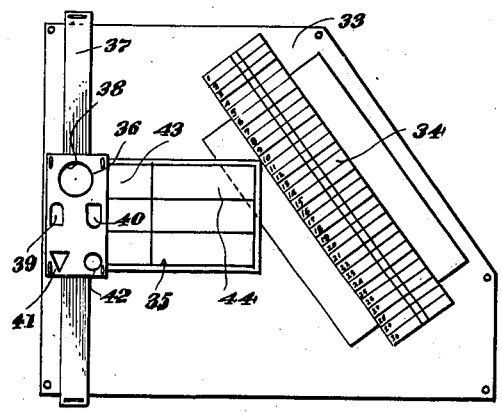
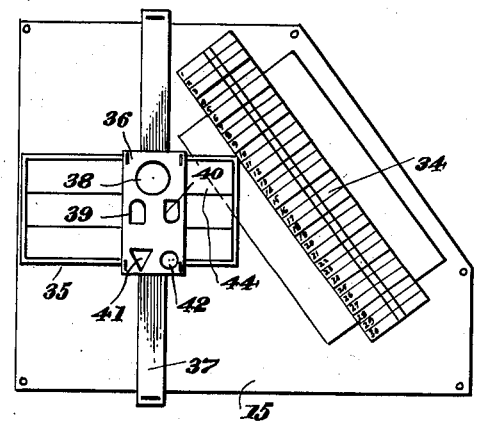
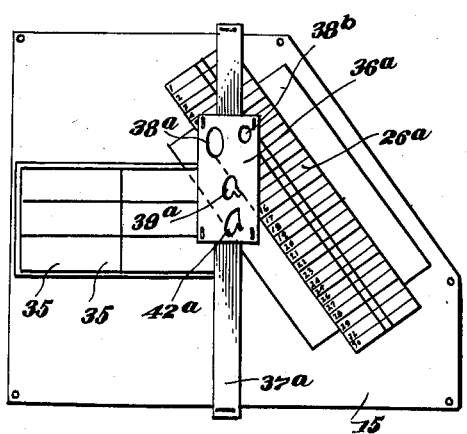
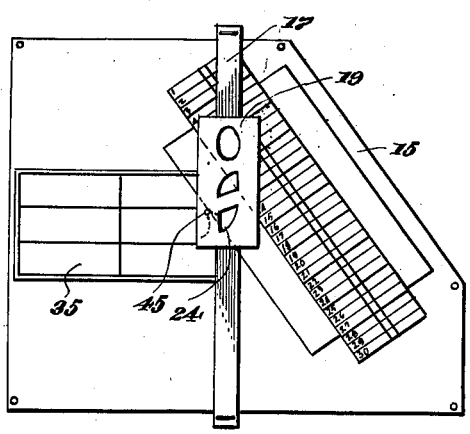
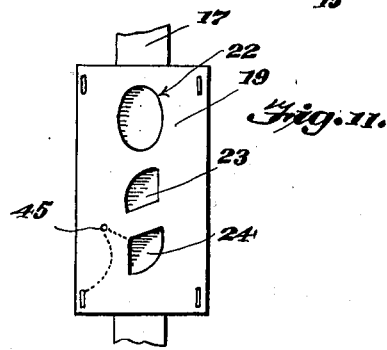
Inventor
CORA M. TAYLOR Patented Mar. 26, 1940

2,195,137

UNITED STATES PATENT OFFICE 2,195,137

WRITING GUIDE

Cora M. Taylor, Miami, Fla.

Application December 30, 1938, Serial No. 248,597

7 Claims. (Cl. 35—37)

This invention relates to writing guides, and has for one of its objects the production of a simple and efficient means for teaching writing, lettering, engrossing and kindred arts.

A further object of this invention is the production of a simple and efficient means for guiding the hand of an operator in a natural position when following certain selected preliminary drills to teach the proper formation of letters and the like.

Another object of this invention is the production of a means for teaching the operator to acquire and maintain the proper position of the writing paper while writing, and to cause each successive line as the writing proceeds from left to right along the line of writing from line to line thereafter to follow in proper spaced relation.

Other objects and advantages of the invention will appear throughout the following specification and claims.

In the drawings:

Figure 1 is a plan view of the writing guide;

Figure 2 is an irregular sectional view taken on line 2—2 of Figure 1;

Figure 3 is a sectional view taken on line 3—3 of Figure 1;

Figure 4 is a perspective view of a portion of the track strip and showing the practice form mounted thereon;

Figure 5 is an enlarged sectional view taken on line 5—5 of Figure 1;

Figure 6 is a plan view of the writing guide with the track strip and practice form in an adjusted position with respect to a sheet of writing paper;

Figure 7 is a plan view showing a modified type of writing guide;

Figure 8 is a plan view of the type of structure shown in Figure 7, the parts being shown in a differently adjusted position;

Figure 9 is a top plan view illustrating a yet further modified type of writing guide;

Figure 10 is a plan view showing the type of guide illustrated in Figure 1 with a different type of line arrangement; and Figure 11 is an enlarged plan view of the practice form shown in Figure 1, used in connection with the present invention.

By referring to the drawings, it will be seen that A designates a table, desk or other support upon which the writing guide is adapted to be placed. The writing guide comprises a pair of similarly shaped transparent sheets 15 preferably formed of Cellophane or other transparent material, which sheets 15 are secured in any suitable or desired manner along their marginal edges by means of fasteners 16. These fasteners are preferably located at the corners in a manner as shown in Figures 1 and 6.

A pair of track strips 17 preferably extend in a vertical position upon the writing guide, one strip 17 fitting over the upper face of the sheets 15 and the other strip fitting under the lower sheet 15, the track strips 17 being secured at their respective ends by means of staples 18, or by means of any suitable or desired fastening elements. If desired, the strips 17 may be replaced by a T-square without departing from the spirit of the invention. It is necessary, however, that a strip be provided overlying the sheets 15 in a manner as shown in Figures 1 and 6, and that this strip be arranged in a vertical position such as is shown.

A practice form 19 is slidably mounted upon the upper strip 17 which extends across the top face of the upper sheet 15, and this practice form 19 preferably comprises upper and lower plates 20 and 21, the upper plate 20 fitting over the upper face of the upper strip 17, and the lower plate 21 fitting under the upper strip 17 and riding over the upper face of the upper sheet 15 of the writing guide. The plates 20 and 21 may be stapled together to constitute the practice form 19, which form 19 is slidably mounted upon its supporting strip 17. The upper plate 20 of the practice form 19 is provided with an enlarged oval aperture 22 and an irregularly formed aperture 23 having one curved side and two substantially right angular straight side edges which will constitute an n-formation. Below the aperture 23 is formed a third aperture 24, the lower portion of which is u-shaped and the upper portion of which is connected with an angular straight edge to constitute a u-formation. It should be understood that the apertures 22 serve as a guide for the inverted penholder to inscribe perfect ovals so that the operator will get the feel of the muscles of the forearm and finger tips as they roll and develop the proper swing of motion when they later employ the same exercise on paper.

Between the upper and lower sheets 15, I place a margin sheet 25, and upon the margin sheet 25 I place a ruled line guide sheet 26. The line guide sheet 26 may have any suitable parallel substantially transverse lines 27 arranged in groups of three, the third line of each group being a heavy line as indicated at 28. The space between each line is consecutively numbered from top to bottom, and the ruled line guide sheet 26 is also provided with a pair of parallel longitudinally extending spaced lines 29 located at the approximate longitudinal center of the sheet 26. The sheets 15 are provided along the right-hand edge thereof with a diagonally extending edge 30 at an angle of approximately 62½ degrees, which may act as a sight line along which the side edges of the sheets 25 and 26 may be arranged in parallel spaced relation in a manner as shown in Figure 1. It should be understood that the sheets 25 and 26 may be properly adjusted between the sheets 15 to assume a proper position for pupils writing either with the right or the left hand, and that the practice form 19 may be adjusted longitudinally of its supporting strip 17 and also that the supporting strips 17 may be moved to an adjusted position toward the right or left of the sheets 15 merely by sliding these strips 17 in the desired direction as indicated by the arrows in Figure 6.

A writing sheet 31 may be placed upon the upper face of the upper sheet 15 and under the track strip 17 and practice form 19 adjacent the form 19, as shown in Figure 6, whereby the pupil practicing the strokes from the form 19 may easily transform the strokes by shifting his hand slightly to the right and duplicating these strokes on the writing sheet 31. The margin sheet 25 and the guide sheet 26 will indicate the proper position of the writing sheet 31, the upper edge of the writing sheet preferably lying in alignment with one of the lines 27, as is shown in Figure 6. Suitable clamps 32 may be used for attaching the writing guide to the desk, table or other supporting means A.

In the form shown in Figure 7, the writing guide 33 is illustrated which is of the same type as the guide illustrated in Figure 1, and this guide supports the liner or ruled line guide sheet 34. A second liner 35 is employed and is preferably placed so that the left-hand marginal edge fits under the practice form 36, which practice form is slidably mounted upon the track strip 37 similar to the track strip 17 previously described. An enlarged circular aperture 38 is formed in the practice form 36. An aperture 39 is formed in the practice form 36 centrally thereof near the left-hand edge and constituting an n-exercise. To the side of this aperture 39 is provided an inverted aperture 40 to constitute the u-exercise. Below the aperture 39 is a triangular aperture 41 constituting the v-exercise and to the right of the aperture 41 is a small circular aperture 42 to constitute the small o-exercise. When the practice form 36 is in the position shown in Figure 7, the straight vertical strokes are placed within the square 43 of the ruled sheet or liner 35, the strokes being formed by the stylus or writing instrument by following the inner marginal edges of the practice form 36.

The capitals such as capitals C, O, Q, G and S are practiced within the circular aperture 38. By studying Figure 7 it will be seen that if the upper space of the first half of the liner 35 is most convenient for practicing the letter forms, the aperture or n-exercise 39 and the u-exercise 40 may be moved into a proper position by moving the practice form 36 upwardly until these apertures are in a proper relative position with respect to the upper space of the left-hand half of the liner 35. Likewise, when practicing the v-exercise or the small o-exercise, the practice form 36 may be moved upwardly to bring these apertures 41 and 42 in proper alignment with the desired line space in the liner 35. All other strokes are practiced in the square 43 which is located just to the right of the practice form 36. The form shown in Figure 7 is the form used by left-handed pupils. It of course should be understood that the method of use may be varied to suit the convenience of the individual pupil. The straight strokes are preferably practiced in the space 43. For tiny tots Figure 7 is preferable, and the paper is placed horizontally over liner 35 and the printing is vertical printing, and it should be understood that the sliding rule is removed when actual printing takes place.

It has been found that the position shown in Figure 8 is especially adaptable as a practice device for manuscript writing such as is used in the lower grades of many schools by right-handed pupils. The upper aperture 36 occupies the upper space of the second half 44 of the liner 35. In this position the straight vertical strokes are placed within the square 44 to the right of the practice form 36, and the strokes for the capitals C, O, Q, G and S are practiced within the large aperture 38 in the same manner as described with respect to Figure 7.

In the arrangement as shown in Figure 9, the device is particularly adapted for practice by right-handed pupils in training the pupils to execute strokes used in rapid single-stroke lettering. The vertical strokes may be practiced along the right-hand edge of the practice form 36a shown in Figure 9, between the lines 9 and 12, or 12 and 15 formed upon the ruled line guide 26a.

The device is placed as high as possible upon the desk to keep the same in a straight position and ordinarily the lines 15 and 18 on the guide sheet 26a may be found more convenient as the writing lines. The practice form 36a is provided with a large oval aperture 38a in its upper left-hand corner and a smaller circular aperture 38b in its upper right-hand corner for the purpose of providing large and small stroke exercises.

In the structure shown in Figure 9, the aperture 39a constitutes the n-exercise, and the aperture 42a constitutes the u-exercise.

It should be understood that the apertures may be so designed as to provide the desired strokes as well as the angles of the letters, without departing from the spirit of the invention, and in connection with the practice form 36a, I also provide the liner 35a.

In the arrangement shown in Figure 10, it will be noted that the practice form 19 which is slidably mounted upon the track strip 17 is of the type shown in Figure 1, and a small aperture 45 is provided adjacent the left-hand corner of the aperture 24, and a suitable liner sheet 35 is used in conjunction therewith. The type of structure shown in Figure 10 is also shown in detail in Figure 11 and illustrating the manner in which the aperture 45 may be used as a pivot point for the strokes in forming the small letter r, in practice the pupil following the course indicated by dotted lines in Figure 11 when forming this letter. The position shown in the type of structure illustrated in Figure 10 is particularly adaptable for use by right-handed pupils.

When the instrument illustrated and described above is to be used in any of its forms for left-handed pupils, the device is merely moved or twisted at right angles to its position shown in Figure 1, which is the position for right-handed operators. For instance the lower left-hand corner is shifted to the position of the upper left-hand corner and when in this position the left hand follows over the numerals of the liner 34. The practice rules are pulled down to a covered position or writing spot and the push-and-pull exercise is practiced in a horizontal position with an inverted pen pointing toward the left shoulder. The writing proceeds from the operator's natural writing spot or position downward toward the center of the body.

It of course should be understood that the present invention relates to the apparatus illustrated and described and that the method of exercise or the steps to be followed therein may be varied by the instructor to suit the individual conditions arising, but it has been found by practical experience that by using the combination of elements illustrated and described, a very efficient device has been provided which will facilitate the practice by the pupil in the formation of letters. After the proper exercises have been followed by tracing the marginal edges of the various apertures formed in the practice form or forms, such for instance, as the practice form 19, a sheet of paper such as the sheet 31 may be placed upon the upper face of the transparent sheet 15, and these exercises may be transferred and followed out upon the lines of this sheet 31, the ruled line guide sheet 26 as well as the marginal sheet 25, providing means for guiding the user of the device in properly spacing the lines and placing the letter forms or exercises in proper positions upon the sheets.

It should be noted that changes in the construction and arrangements of the device may be employed without departing from the spirit of the invention so long as such changes fall within the scope of the appended claims.

Having described the invention, what I claim as new is:

1. A writing guide of the class described comprising a transparent body, a ruled guiding indicator placed below the transparent body to be viewed through the transparent body and protected thereby and extending at a convenient angular position to the horizontal, the ruled guiding indicator being adapted to constitute a guide for a practice sheet to indicate the proper angular position thereof, and a practice form adjustably mounted upon the body and movable vertically and horizontally upon the body toward and away from said ruled guiding indicator.

2. As an article of manufacture, a writing guide comprising a pair of transparent sheets secured together adjacent their marginal edges, said sheets having a side edge extending at an incline to the horizontal, a paper guide fitted between the transparent sheets to indicate a proper writing position of a sheet of writing paper, track strips slidably mounted upon said sheets and movable transversely thereof, and a practice form movable longitudinally of said track strips.

3. As an article of manufacture, a writing guide comprising a pair of transparent sheets secured together adjacent their marginal edges, said sheets having a side edge extending at an incline to the horizontal, a paper guide fitted between the transparent sheets to indicate a proper writing position of a sheet of writing paper, track strips slidably mounted upon said sheets and movable transversely thereof, a practice form movable longitudinally of said track strips, and said track strips partly encasing the body.

4. As an article of manufacture, a writing guide comprising a pair of transparent sheets secured together adjacent their marginal edges, said sheets having a side edge extending at an incline to the horizontal, a paper guide fitting between the transparent sheets to indicate a proper writing position of a sheet of writing paper, track strips slidably mounted upon said sheets and movable transversely thereof, and a practice form movable longitudinally of said track strips, said practice form having a plurality of selectively shaped apertures constituting writing guides to facilitate the formation of letters.

5. As an article of manufacture, a writing guide comprising a pair of transparent sheets secured together adjacent their marginal edges, said sheets having a side edge extending at an incline to the horizontal, a paper guide fitted between the transparent sheets to indicate a proper writing position of a sheet of writing paper, track strips slidably mounted upon said sheets and movable transversely thereof, a practice form movable longitudinally of said track strips, said practice form having a plurality of selectively shaped apertures constituting writing guides to facilitate the formation of letters, and one of the apertures being substantially circular, and another of the apertures having straight and irregularly-shaped guiding edges.

6. In combination with a body formed of transparent material, a ruled line guide sheet fitted under the transparent body, a margin sheet, track strips engaging the upper and under faces of said body, the track strips projecting beyond the edges of the body, means connecting the ends of the track strips for slidably mounting the track strips upon the body, a practice form slidably mounted longitudinally of one of the track strips, and said practice form having letter-forming indicating means to facilitate the formation of letters when following the practice form.

7. In combination with a body formed of transparent material, a ruled line guide sheet fitted under the transparent body, a margin sheet, track strips engaging the upper and under faces of said body, the track strips projecting beyond the edges of the body, means connecting the ends of the track strips for slidably mounting the track strips upon the body, a practice form slidably mounted longitudinally of one of the track strips, said practice form having letter-forming indicating means to facilitate the formation of letters when following the practice form, and an additional liner adapted to be placed partly under and adjacent to the practice form.

CORA M. TAYLOR.